US009243543B2

(12) United States Patent
Bertrand et al.

(10) Patent No.: US 9,243,543 B2
(45) Date of Patent: Jan. 26, 2016

(54) UNIVERSAL ATTENUATION DEVICE FOR AIR-CONDITIONING CIRCUIT

(71) Applicant: VISTEON GLOBAL TECHNOLOGIES, INC., Van Buren Township, MI (US)

(72) Inventors: David William Bertrand, Warren, MI (US); Kastriot Shaska, Northville, MI (US); Yafei Zhou, Canton, MI (US)

(73) Assignee: Hanon Systems, Daejeon-si (KR)

( * ) Notice: Subject to any disclaimer, the term of this patent is extended or adjusted under 35 U.S.C. 154(b) by 0 days.

(21) Appl. No.: 13/708,273

(22) Filed: Dec. 7, 2012

(65) Prior Publication Data

US 2014/0158461 A1 Jun. 12, 2014

(51) Int. Cl.
| | |
|---|---|
| *F01N 13/08* | (2010.01) |
| *B60H 1/00* | (2006.01) |
| *F24F 13/24* | (2006.01) |
| *F16L 55/027* | (2006.01) |
| *F16L 55/033* | (2006.01) |

(52) U.S. Cl.
CPC ............ *F01N 13/08* (2013.01); *B60H 1/00571* (2013.01); *F16L 55/02763* (2013.01); *F16L 55/0331* (2013.01); *F24F 13/24* (2013.01); *B60H 2001/006* (2013.01); *F25B 2500/12* (2013.01)

(58) Field of Classification Search
CPC ........... B60H 1/00564; B60H 1/00571; B60H 2001/006
USPC ......... 181/229, 251, 253, 257, 268, 275, 279, 181/280; 417/312
See application file for complete search history.

(56) References Cited

U.S. PATENT DOCUMENTS

| | | | |
|---|---|---|---|
| 2,624,418 A | 1/1953 | Bourne | |
| 3,006,160 A | 10/1961 | Heidorn | |
| 3,036,653 A * | 5/1962 | Calabresi | 181/253 |
| 4,050,539 A * | 9/1977 | Kashiwara et al. | 181/280 |
| 4,203,503 A | 5/1980 | Franco et al. | |
| 4,501,341 A * | 2/1985 | Jones | 181/250 |
| 4,605,092 A | 8/1986 | Harris et al. | |
| 4,628,689 A | 12/1986 | Jourdan | |
| 5,117,939 A * | 6/1992 | Noguchi et al. | 181/224 |

(Continued)

FOREIGN PATENT DOCUMENTS

| | | |
|---|---|---|
| WO | 2005035949 A1 | 4/2005 |
| WO | 2008015046 A1 | 2/2008 |

OTHER PUBLICATIONS

English machine translation of WO 2008/015046 A1; accessed Oct. 20, 2014 from Espacenet; http://translationportal.epo.org/emtp/translate/?ACTION=description-retrieval&COUNTRY=WO&ENGINE=google&FORMAT=docdb&KIND=A1&LOCALE=en_EP&NUMBER=2008015046&OPS=ops.epo.org/3.1&SRCLANG=de&TRGLANG=en.*

*Primary Examiner* — Jeremy Luks
(74) *Attorney, Agent, or Firm* — Fraser Clemens Martin & Miller LLC; James D. Miller

(57) ABSTRACT

An attenuation device for a vehicle is provided, including a housing having a chamber formed therein. The housing is coupled to and in fluid communication with an air-conditioning circuit of the vehicle. A dampening member is disposed within the chamber of the housing. The dampening member includes a partition plate having at least one pipe disposed therein. The dampening member is configured to attenuate acoustic energy produced by a fluid of the air-conditioning circuit.

20 Claims, 2 Drawing Sheets

(56) References Cited

U.S. PATENT DOCUMENTS

| | | | |
|---|---|---|---|
| 5,183,974 A * | 2/1993 | Wilhelm et al. | 181/0.5 |
| 5,457,290 A | 10/1995 | Sase et al. | |
| 5,545,860 A * | 8/1996 | Wilkes et al. | 181/255 |
| 5,955,707 A * | 9/1999 | Fritz | 181/282 |
| 6,446,454 B1 | 9/2002 | Lee et al. | |
| 7,578,659 B2 | 8/2009 | Fox et al. | |
| 7,849,705 B2 | 12/2010 | Lee et al. | |
| 8,016,071 B1 | 9/2011 | Martinus et al. | |
| 2005/0076668 A1* | 4/2005 | Choi | 62/404 |
| 2008/0233856 A1* | 9/2008 | Okawa et al. | 454/143 |
| 2010/0193282 A1* | 8/2010 | Kim et al. | 181/229 |

* cited by examiner

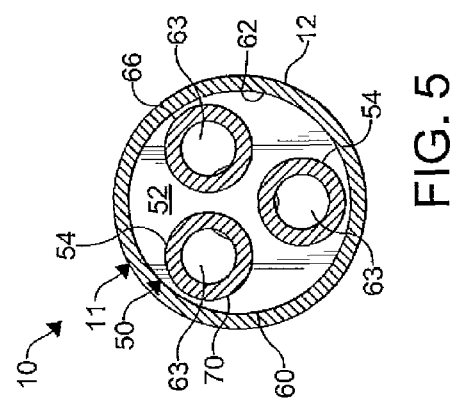
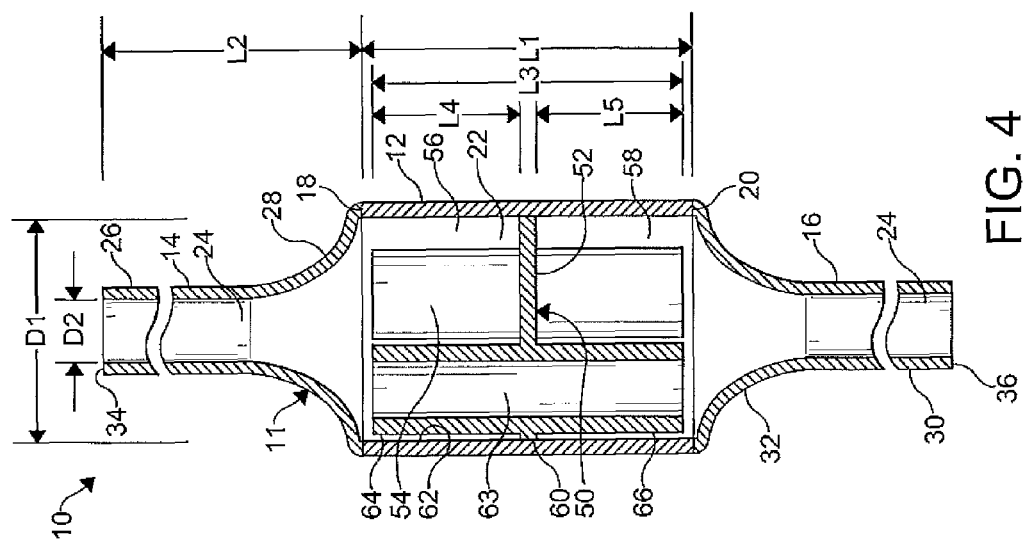
FIG. 5
FIG. 4

UNIVERSAL ATTENUATION DEVICE FOR AIR-CONDITIONING CIRCUIT

FIELD OF THE INVENTION

The present invention relates generally to an attenuation device and, more particularly, to an attenuation device for an air-conditioning circuit.

BACKGROUND OF THE INVENTION

Attenuation devices for smoothing of pressure surges in fluid systems and for reducing the resulting vibrations and noise can be divided mainly into two known groups of attenuation devices. One group includes hydropneumatic attenuators such as hydraulic accumulators containing an additional gas volume, for example. The other group includes fluid sound attenuators, so-called silencers, in which without an additional gas volume an attenuation effect takes place by reflection or absorption.

The hydropneumatic attenuators typically attenuate a frequency band extending from very low frequencies to about 400 Hz. As such, the hydropneumatic attenuators are particularly suitable for use in fluid systems in which pressure pulsations occur in this frequency band due to operation of compressors, engagement and disengagement processes of the compressors, as well as operating processes of the compressors. Since the hydropneumatic attenuators with additional gas volumes are both bulky and heavy, the hydropneumatic attenuation devices cannot be used in many applications where installation space is limited and a lightweight construction is necessary, as is the case, for example, in air-conditioning systems in motor vehicles. Other disadvantages of attenuation devices with an additional gas volume are that the attenuation action varies depending on a temperature and that the attenuation action overall is degraded by gas losses due to permeation.

Conversely, the fluid sound attenuators are far more compact and have a lightweight construction. However, use of the fluid sound attenuators is limited by the attenuation action being sufficient only at higher frequencies. Because of this limitation, the fluid sound attenuators are typically not ideal for use in air-conditioning circuits, which produce a very wide frequency band extending from very low frequencies to very high frequencies.

It would be desirable to produce an attenuation device which is configured to attenuate acoustic energy over a wide range of frequencies, wherein a structural complexity and a package size thereof are minimized.

SUMMARY OF THE INVENTION

In concordance and agreement with the present disclosure, an attenuation device which is configured to attenuate acoustic energy over a wide range of frequencies, wherein a structural complexity and a package size thereof are minimized, has surprisingly been discovered.

In one embodiment, an attenuation device, comprises: a housing including at least one chamber formed therein; and a dampening member disposed within the at least one chamber, the dampening member including a partition plate having at least one pipe extending therethrough, wherein the dampening member and the housing are configured to attenuate acoustic energy occurring within a frequency band of about 200 Hz to about 2000 Hz.

In another embodiment, an attenuation device, comprises: a housing including a main body section, an inlet section, and an outlet section, wherein at least one of the main body section, the inlet section, and the outlet section cooperate to form at least one chamber, and wherein the housing is configured to militate against entrapment of a fluid in the chamber; and a dampening member disposed within the at least one chamber, the dampening member including a partition plate having at least one pipe extending therethrough, wherein the at least one pipe includes a first end and a second end.

In a further embodiment, an attenuation device for a vehicle, comprises: a housing including at least one chamber formed therein, wherein the housing is coupled to and in fluid communication with an air-conditioning circuit; and a dampening member disposed within the at least one chamber to attenuate acoustic energy produced by a fluid of the air-conditioning circuit, wherein the dampening member includes a partition plate and at least one pipe extending through the partition plate.

BRIEF DESCRIPTION OF THE DRAWINGS

The above, as well as other objects and advantages of the invention, will become readily apparent to those skilled in the art from a reading the following detailed description of the invention when considered in the light of the accompanying drawings in which:

FIG. 4 is a cross-sectional elevational view of the attenuation device illustrated in FIG. 1 taken along section line 4-4 showing a dampening member of the attenuation device according to another embodiment of the present invention; and FIG. 5 is a cross-sectional view of the attenuation device illustrated in FIG. 1 taken along section line 5-5 showing the dampening member of FIG. 4 disposed therein.

DETAILED DESCRIPTION OF THE INVENTION

Figure 3:
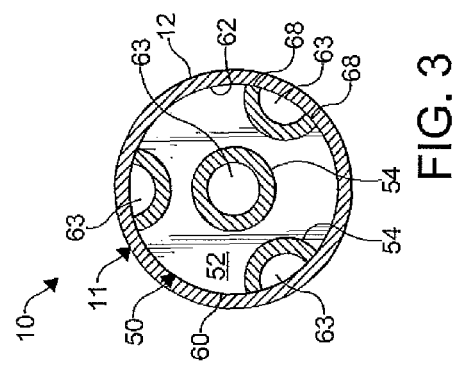
FIG. 3 is a cross-sectional view of the attenuation device illustrated in FIG. 1 taken along section line 3-3 showing the dampening member of FIG. 2 disposed therein.

The following detailed description and appended drawings describe and illustrate various exemplary embodiments of the invention. The description and drawings serve to enable one skilled in the art to make and use the invention, and are not intended to limit the scope of the invention in any manner.

FIGS. 1-5 show an attenuation device 10 according to the present invention. It is contemplated that the attenuation device 10 can be employed in an air-conditioning circuit (not shown) of a vehicle (not shown). Those skilled in the art will appreciate that the attenuation device 10 can be used in other applications if desired. The attenuation device 10 is configured to attenuate acoustic energy having frequencies in a range of about 200 Hz to about 2000 Hz which is produced from pressure pulsation waves of a fluid (e.g. a refrigerant of the air-conditioning circuit). More specifically, the attenuation device 10 is configured to attenuate acoustic energy having frequencies in a range of about 250 Hz to about 1700 Hz. Accordingly, attenuation device 10 can be employed in a variety of vehicle platforms or systems.

The attenuation device 10 includes a housing 11 having a substantially cylindrical main body section 12, an inlet section 14, and an outlet section 16. Each of the sections 12, 14, 16 of the attenuation device 10 can be formed from any suitable material such as a metal material or a non-metal material, for example. In certain embodiments, the main body section 12 has an inner hydraulic diameter D1 in a range of about 30 mm to about 80 mm and a length L1 in a range of about 30 mm to about 135 mm. In a non-limiting example, the inner hydraulic diameter D1 is about 38 mm and the length L1 is about 70 mm. It is understood, however, that the main body section 12 can have any suitable shape and size as desired.

Opposing ends 18, 20 of the main body section 12 are capped by the inlet section 14 and the outlet section 16, respectively. Various methods and processes can be employed to couple the inlet section 14 and the outlet section 16 to the main body section 12 such as by welding, heat welding, brazing, soldering, or using an adhesive or at least one fastener, for example. The inlet section 14 and the outlet section 16 extend laterally outwardly in opposite directions away from the main body section 12. As illustrated, the main body section 12 includes a chamber 22 formed therein. Additional chambers 22 than shown can be formed in the housing 11 as desired. It is understood that the chamber 22 may extend into at least part of the inlet section 14 and at least part of the outlet section 16 if desired. Each of the inlet section 14 and the outlet section 16 includes a passageway 24 formed therein. The chamber 22 and the passageways 24 are configured to receive a flow of the fluid therein.

In certain embodiments, the inlet section 14 and the outlet section 16 are configured to facilitate a manufacturing and cleaning of the attenuation device 10. As a non-limiting example, the inlet section 14 has a generally conical shape and includes a substantially tubular portion 26 having radially outwardly flared first end 28 adjacent the main body section 12. Similarly, the outlet section 16 has a generally conical shape and includes a substantially tubular portion 30 having a radially outwardly flared first end 32 adjacent the main body section 12. Because the first ends 28, 32 of the respective inlet and outlet section 14, 16 do not extend into the chamber 22 of the main body section 12, entrapment of moisture and other fluids (i.e. water, oil, etc.) within the chamber 22 is militated against. Additionally, the first end 28 of the inlet section 14 functions as a diffuser and substantially uniformly distributes the flow of the fluid into the main body section 12. On the other hand, the first end 32 of the outlet section 16 functions as a funnel and collects the flow of the fluid from the main body section 12. In certain embodiments, each of the substantially tubular portions 26, 30 has an inner hydraulic diameter D2 in a range of about 7.5 mm to about 20 mm and has any length L2 as desired. As a non-limiting example, the inner hydraulic diameter D2 of each of the substantially tubular portions 26, 30 is about 9.4 mm. However, it is understood that the inlet section 14 and the outlet section 16 can have any suitable shape and size as desired. In certain embodiments, the attenuation device 10 is connected to the air-conditioning circuit. As a non-limiting example, a second end 34 of the substantially tubular portion 26 of the inlet section 14 is fluidly connected to a discharge side of a compressor of the air-conditioning circuit, and a second end 36 of the substantially tubular portion 30 of the outlet section 16 is fluidly connected to an inlet side of a condenser of the air-conditioning circuit. It is understood that the attenuation device 10 can be fluidly connected to other components of the air-conditioning circuit if desired.

As illustrated in FIGS. 2-5, a dampening member 50 is disposed in the chamber 22 of the attenuation device 10. It is understood that the dampening member 50 can be separately formed from the main body section 12 or integrally formed with the main body section 12 to form a unitary structure. The dampening member 50 shown includes a partition plate 52 and one or more substantially cylindrical pipes 54 disposed therein. Those skilled in the art will appreciate that the pipes 54 and the partition plate 52 can be separately or integrally formed if desired. In certain embodiments, the dampening member 50 is formed from a plastic material. However, it is understood that other materials can be used to form the dampening member 50 if desired.

The partition plate 52 is positioned within the chamber 22 as desired to form a first sub-chamber 56 and a second sub-chamber 58. As shown, the partition plate 52 is positioned within the chamber 22 such that the first sub-chamber 56 and the second sub-chamber 58 have substantially equal volumes. It is understood, however, that the partition plate 52 can be positioned within the chamber 22 such that the first sub-chamber 56 has a greater volume than the second sub-chamber 58 or the first sub-chamber 56 has a lesser volume than the second sub-chamber 58. In certain embodiments, the partition plate 52 is positioned substantially perpendicular a direction of flow of the fluid into the chamber 22. As a non-limiting example, the partition plate 52 is positioned at an angle greater than 45° in respect of a longitudinal axis of the attenuation device 10. Those skilled in the art will appreciate that the partition plate 52 can be positioned in the chamber 22 of the attenuation device 10 at any location and at any angle as desired. The partition plate 52 shown is a substantially planar plate having a generally circular shape. It is understood, however, that the partition plate 52 can have other shapes and configurations as desired. For example, the partition plate 52 can be a substantially curved plate having at least one convex or concave surface in respect to a direction of the flow of the fluid through the attenuation device 10. An outer peripheral surface 60 of the partition plate 52 abuts an inner surface 62 of the main body section 12. A fluid-tight connection can be formed between the peripheral surface 60 of the partition plate 52 and the inner surface 62 of the main body section 12 to militate against the flow of fluid therebetween.

As illustrated, each of the pipes 54 includes a passageway 63 to receive the flow of the fluid therein. More particularly, the passageways 63 of the tubes 54 permit the flow of the fluid from the first sub-chamber 56 into the second sub-chamber 58. The pipes 54 shown have a generally linear configuration. Various other shapes and configurations of the pipes 54 can be employed if desired. In a non-limiting example, a length L3 of each of the pipes 54 is in range of about 25 mm to about 125 mm, and more specifically 61 mm. In certain embodiments, a ratio of the length L3 of each of the pipes 54 to the length L1 of the main body section 12 is in a range of about 0.05 to about 0.95. In a non-limiting example, the ratio of the length L3 of each of the pipes 54 to the length L1 of the main body section 12 is at least 0.25, and more specifically about 0.85. The ratio of the length L3 of each of the pipes 54 to the length L1 of the main body section 12 affects a transmission loss of the attenuation device 10. Thus, as the ratio of the length L3 of each of the pipes 54 to the length L1 of the main body section 12 increases, the transmission loss of the attenuation device 10 also increases, especially for low frequencies. It is understood that, for silencers or attenuation devices, the transmission loss is defined as a ratio of a sound power incident on an inlet of the device to that of the sound power leaving the device at an outlet thereof. In certain embodiments, a cumulative cross-sectional flow area of the pipes 54 is greater than one-half of a cross-sectional flow area of the substantially tubular portion 26 of the inlet section 14. For example, the cumulative cross-sectional flow area of the pipes 54 is greater than one-half of a cross-sectional flow area of a refrigerant conduit of the air-conditioning circuit. Those skilled in the art will appreciate that the cumulative cross-sectional flow area of the pipes 54 can be any of any size and dimension to attenuate the pulsation waves of the fluid.

In certain embodiments, each of the pipes 54 extends laterally outwardly from opposite sides of the partition plate 52. A first end 64 of the pipes 54 extends away from the partition plate 52 into the first sub-chamber 56 and towards the inlet section 14. In a non-limiting example, a length L4 of the first end 64 is in a range of about 12.5 mm to about 62.5 mm, and more specifically 29 mm. Conversely, a second end 66 of the pipes 54 extends away from the partition plate 52 into the second sub-chamber 58 and towards the outlet section 16. In a non-limiting example, a length L5 of the second end 66 is in a range of about 12.5 mm to about 62.5 mm, and more specifically 29 mm. Although the length L4 of the first end 64 of the pipes 54 shown is substantially equal to the length L5 of the second end 66 of the pipes 54, the length L4 of the first end 64 and the length L5 of the second end 66 can be any suitable length as desired. In a non-limiting example, a ratio of the length L4 of the first end 64 to the length L5 of the second end 66 is in a range of about 0.01 to about 1.0, and more specifically 0.475. The ratio of the length L4 of the first end 64 to the length L5 of the second end 66 is optimized to maximize the transmission loss of the attenuation device. It is understood that the ends 64, 66 can have any suitable shape and size as desired.

Figure 2:
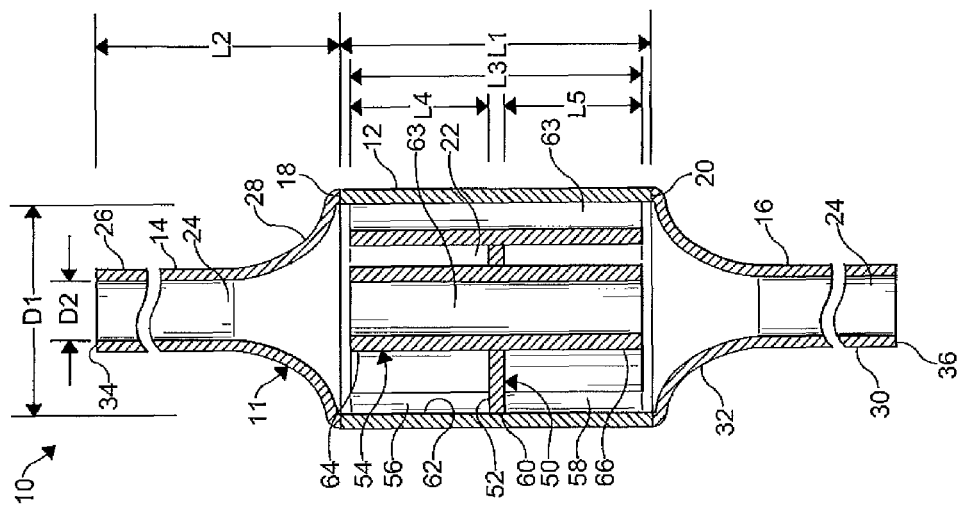
FIG. 2 is a cross-sectional elevational view of the attenuation device illustrated in FIG. 1 taken along section line 2-2 showing a dampening member of the attenuation device according to an embodiment of the present invention.
Figure 1:
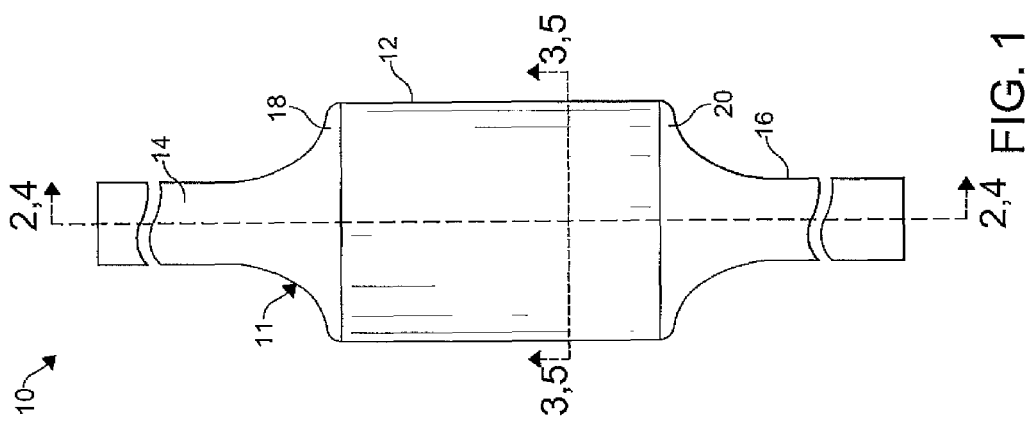
FIG. 1 is a side elevational view of an attenuation device of the present invention.

As illustrated in the embodiment of the invention shown FIGS. 2-3, one of the pipes 54 of the dampening member 50 is centrally located and is surrounded by an array of spaced apart partial pipes 54. The partial pipes 54 shown are substantially uniformly spaced apart from the centrally located pipe 54 and each adjacent one of the partial pipes 54 to permit a substantially uniform distribution of the flow of the fluid through the attenuation device 10. In certain embodiments, the pipes 54 are uniformly positioned in respect to a central axis of the attenuation device 10 and the passageway 24 of the inlet section 14 to further facilitate the substantially uniform distribution of the flow of the fluid through the attenuation device 10. Those skilled in the art will appreciate that at least one of the pipes 54 can be non-uniformly spaced apart if desired. As more clearly shown in FIG. 3, edge surfaces 68 of each of the partial pipes 54 abut the inner surface 62 of the main body section 12 to maximize contact between the partial pipes 54 and the main body section 12, thereby minimizing noise produced during operation of the attenuation device 10.

With renewed reference to FIGS. 4-5, the dampening member 50 according to another embodiment of the invention includes an array of spaced apart pipes 54. The pipes 54 shown are substantially uniformly spaced apart from each adjacent one of the pipes 54 to permit a substantially uniform distribution of the flow of the fluid through the attenuation device 10. In certain embodiments, the pipes 54 are uniformly positioned in respect to the central axis of the attenuation device 10 and the passageway 24 of the inlet section 14 to further facilitate the substantially uniform distribution of the flow of the fluid through the attenuation device 10. Those skilled in the art will appreciate that at least one of the pipes 54 can be non-uniformly spaced apart if desired. As more clearly shown in FIG. 5, an outer surface 70 of each of the pipes 54 is spaced apart from the inner surface 62 of the main body section 12 to form a gap therebetween. The gap militates against undesired contact between the pipes 54 and the main body section 12, thereby minimizing noise produced during operation of the attenuation device 10.

It is understood that the dampening member 50 can include any number of the pipes 54 as desired. It is also understood that the pipes 54 can be disposed in the partition plate 52 in any suitable configuration to attenuate the pulsation waves of the fluid and permit the substantially uniform distribution of the flow of the fluid through the attenuation device 10 as desired.

In operation, the flow of the fluid enters the attenuation device 10 through the second end 34 of the inlet section 14. The fluid flows through the passageway 24 of the inlet section 14 and into the first sub-chamber 56 of the main body section 12. On entering the first sub-chamber 56, the fluid expands before passing through the pipes 54 and, subsequently into the second sub-chamber before being discharged through the outlet section 16. The successive expansions of fluid in the sub-chambers 56, 58 and the dampening member 50 function to dissipate acoustic energy at the respective frequencies to which the attenuation device 10 is tuned to attenuate so as to effect a two-stage reduction in noise of the fluid.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. An attenuation device, comprising:
    a housing having a hollow interior, the hollow interior including at least one chamber, an inlet section having a radially outwardly flared first end, and an outlet section having a radially outwardly flared first end; and
    a dampening member disposed within the at least one chamber, the dampening member including a partition plate disposed in a substantially orthogonal manner to a longitudinal direction of the at least one chamber, the partition plate having at least one pipe extending therethrough and an outer peripheral surface abutting an inner surface of the housing and forming a first sub-chamber and a second sub-chamber, each of the first sub-chamber and the second sub-chamber longitudinally disposed in the at least one chamber, wherein the first end of the inlet section is directly coupled to both the first sub-chamber and a first end of the at least one pipe and the first end of the outlet section is directly coupled to both the second sub-chamber and a second end of the at least one pipe, wherein the dampening member and the housing are configured to attenuate acoustic energy occurring within a frequency band of about 200 Hz to about 2000 Hz.

2. The attenuation device of claim 1, wherein the housing is in fluid communication with an air-conditioning circuit of a vehicle.

3. The attenuation device of claim 2, wherein the at least one pipe has a cumulative cross-sectional flow area greater than one-half of a cross-sectional flow area of a refrigerant conduit of the air-conditioning circuit of the vehicle.

4. The attenuation device of claim 2, wherein the dampening member is configured to attenuate acoustic energy produce by pulsation waves of a fluid flowing through the air-conditioning circuit of the vehicle.

5. The attenuation device of claim 1, wherein at least one of the inlet section and the outlet section is configured to militate against entrapment of a fluid within the at least one chamber.

6. The attenuation device of claims 1, wherein the partition plate is positioned in the at least one chamber at an angle greater than 45° in respect of a longitudinal axis of the housing.

7. The attenuation device of claim 1, wherein the at least one pipe has a length in a range of about 25 mm to about 125 mm.

8. The attenuation device of claim 1, wherein the at least one pipe is a partial pipe configured to abut an inner surface of the housing.

9. The attenuation device of claim 1, wherein an outer surface of the at least one pipe is spaced apart from an inner surface of the housing to form a gap therebetween.

10. The attenuation device of claim 1, wherein the at least one pipe is configured to facilitate substantially uniform flow distribution of a fluid through the housing.

11. An attenuation device, comprising:
  a housing including a main body section, an inlet section having a radially outwardly flared first end, and an outlet section having a radially outwardly flared first end, wherein at least one of the main body section, the inlet section, and the outlet section cooperate to form at least one chamber, and wherein the housing is configured to militate against entrapment of a fluid in the at least one chamber; and
  a dampening member disposed within the at least one chamber, the dampening member including a partition plate disposed in a substantially orthogonal manner to a longitudinal direction of the at least one chamber, the partition plate having at least one pipe extending therethrough and an outer peripheral surface abutting an inner surface of the housing and forming a first sub-chamber and a second sub-chamber, each of the first sub-chamber and the second sub-chamber longitudinally disposed in the at least one chamber, wherein the first end of the inlet section is directly coupled to both the first sub-chamber and a first end of the at least one pipe and the first end of the outlet section is directly coupled to both the second sub-chamber and a second end of the at least one pipe.

12. The attenuation device of claim 11, wherein the main body section has a length in a range of about 30 mm to about 135 mm.

13. The attenuation device of claim 11, wherein at least one of the inlet section and the outlet section is in fluid communication with an air-conditioning circuit of a vehicle.

14. The attenuation device of claim 11, wherein the at least one pipe has a length in a range of about 25 mm to about 125 mm.

15. The attenuation device of claim 11, wherein a ratio of a length of the at least one pipe to a length of the main body section is in a range of about 0.05 to about 0.95.

16. The attenuation device of claim 11, wherein a ratio of a distance from the partition plate to the first end of the at least one pipe to a distance from the partition plate to the second end of the at least one pipe is in a range of about 0.01 to about 1.0.

17. The attenuation device of claim 11, wherein the first end and the second end of the at least one pipe extend laterally outwardly from opposing sides of the partition plate.

18. The attenuation device of claim 11, wherein the dampening member and the housing are configured to attenuate acoustic energy having a frequency between about 200 Hz and about 2000 Hz.

19. An attenuation device for a vehicle, comprising:
  a housing having a hollow interior, the hollow interior including at least one chamber, an inlet section having a radially outwardly flared first end, and an outlet section having a radially outwardly flared first end, wherein the housing is in fluid communication with an air-conditioning circuit; and
  a dampening member disposed within the at least one chamber to attenuate acoustic energy produced by a fluid of the air-conditioning circuit, wherein the dampening member includes a partition plate disposed in a substantially orthogonal manner to a longitudinal direction of the at least one chamber and at least one pipe extending through the partition plate, the partition plate having an outer peripheral surface abutting an inner surface of the housing and forming a first sub-chamber and a second sub-chamber, each of the first sub-chamber and the second sub-chamber longitudinally disposed in the at least one chamber, wherein the first end of the inlet section is directly coupled to both the first sub-chamber and a first end of the at least one pipe and the first end of the outlet section is directly coupled to both the second sub-chamber and a second end of the at least one pipe.

20. The attenuation device of claim 19, wherein the dampening member and the housing are configured to attenuate acoustic energy having a frequency between about 200 Hz and about 2000 Hz.

* * * * *